United States Patent
Uebbing et al.

(10) Patent No.: US 7,024,062 B2
(45) Date of Patent: Apr. 4, 2006

(54) OPTICAL SWITCH WITH LOW PRESSURE BUBBLE

(76) Inventors: John Julian Uebbing, 665 Towle Pl., Palo Alto, CA (US) 94306; Dale Schroeder, 1555 Tucker Rd., Scotts Valley, CA (US) 95066

(*) Notice: Subject to any disclaimer, the term of this patent is extended or adjusted under 35 U.S.C. 154(b) by 150 days.

(21) Appl. No.: 10/786,213

(22) Filed: Feb. 25, 2004

(65) Prior Publication Data

US 2005/0185883 A1 Aug. 25, 2005

(51) Int. Cl.
G02B 6/26 (2006.01)
(52) U.S. Cl. .......................... 385/12; 385/18
(58) Field of Classification Search ............... None
See application file for complete search history.

(56) References Cited

U.S. PATENT DOCUMENTS

| 5,699,462 | A | 12/1997 | Fouquet et al. |
| 6,072,924 | A * | 6/2000 | Sato et al. ............. 385/18 |
| 6,195,478 | B1 | 2/2001 | Fouquet |
| 6,320,994 | B1 | 11/2001 | Donald et al. |
| 6,324,316 | B1 | 11/2001 | Fouquet et al. |
| 6,487,333 | B1 | 11/2002 | Fouquet et al. |

* cited by examiner

*Primary Examiner*—Juliana Kang

(57) ABSTRACT

An optical switch is presented. In a first state, a trench is filled with index matching fluid so that light from a first waveguide passes through the trench to a second waveguide. In a second state, a bubble is formed within the index matching fluid so that light from the first waveguide is reflected at the trench to a third waveguide. The bubble is formed by heat so that volume of the bubble is substantially less than total volume of the trench, resulting in pressure within the bubble not being substantially increased by pressure exerted by sidewalls of the trench.

9 Claims, 6 Drawing Sheets

OPTICAL SWITCH WITH LOW PRESSURE BUBBLE

BACKGROUND

The present invention relates to optical switching devices and pertains particularly to the generation of cool optical switch bubbles.

Optical fibers provide significantly higher data rates than electronic paths. However, effective utilization of the greater bandwidth inherent in optical signal paths requires optical cross-connect switches.

One type of optical cross-connect switch utilizes total internal reflection (TIR) switching elements. A TIR element consists of a waveguide with a switchable boundary. Light strikes the boundary at an angle. In the first state, the boundary separates two regions having substantially different indices of refraction. In this state the light is reflected off of the boundary and thus changes direction. In the second state, the two regions separated by the boundary have the same index of refraction and the light continues in a straight line through the boundary. The magnitude of the change of direction depends on the difference in the index of refraction of the two regions. To obtain a large change in direction, the region behind the boundary must be switchable between an index of refraction equal to that of the waveguide and an index of refraction that differs markedly from that of the waveguide.

One type of TIR element is taught in U.S. Pat. No. 5,699,462 which is hereby incorporated by reference. The TIR element taught in this patent utilizes thermal activation to displace liquid from a gap at the intersection of a first optical waveguide and a second optical waveguide. In this type of TIR, a trench is cut through a waveguide. The trench is filled with an index-matching liquid. A bubble is generated at the cross-point by heating the index matching liquid with a localized heater. The bubble must be removed from the crosspoint to switch the cross-point from the reflecting to the transmitting state and thus change the direction of the output optical signal. Efficient operation of such a TIR element requires effective placement and operation of heating devices within and around the TIR elements.

SUMMARY OF THE INVENTION

In accordance with an embodiment of the present invention, an optical switch is presented. In a first state, a trench is filled with index matching fluid so that light from a first waveguide passes through the trench to a second waveguide. In a second state, a bubble is formed within the index matching fluid so that light from the first waveguide is reflected at the trench to a third waveguide. The bubble is formed by heat so that volume of the bubble is substantially less than total volume of the trench, resulting in pressure within the bubble not being substantially increased by pressure exerted by sidewalls of the trench.

DESCRIPTION OF THE EMBODIMENT

Figure 1:
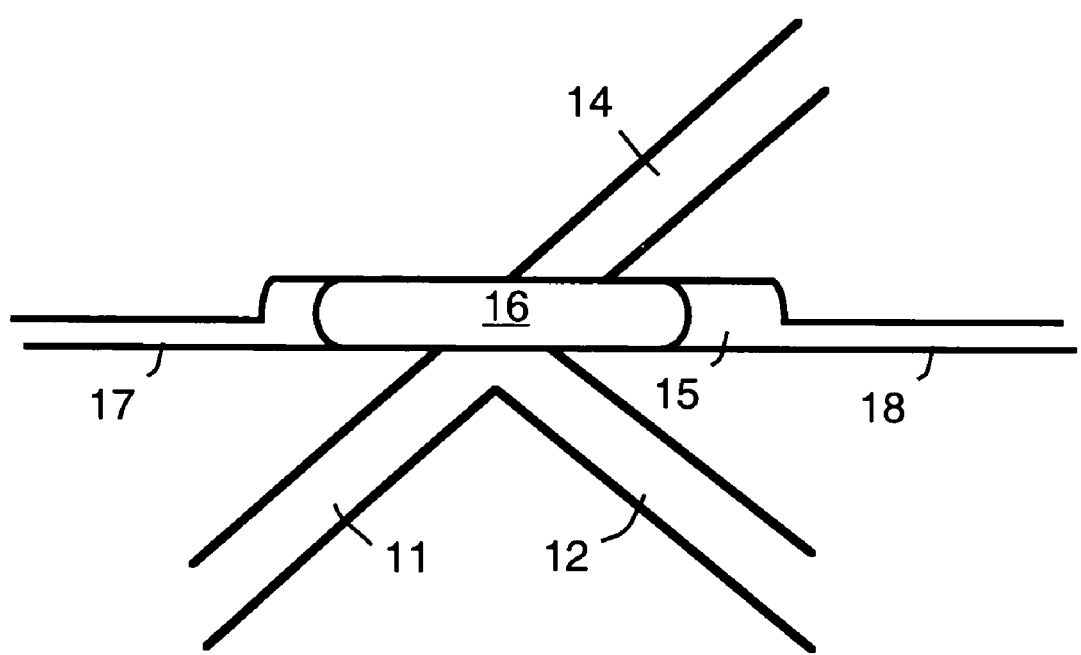
FIG. 1 shows a simplified top view of an optical switch in accordance with an embodiment of the present invention.

FIG. 1 shows a simplified top view of an optical switch. For example the optical switch is a total internal reflection (TIR) switch. For example, light traveling down waveguide 11 impinges a mirror wall of trench 15. When trench 15 is filled with index matching liquid, the light proceeds through trench 16 into waveguide 14. When a bubble 16 is present, light reflects off trench 15 and bubble 16 and proceeds down waveguide 12.

For example, waveguide 11, waveguide 12 and waveguide 14 are each approximately 16 microns wide and approximately 8 microns deep. For example, trench 15 is approximately 100 microns long and approximately 60 microns deep. In a center section, trench is approximately 15 microns wide. In a neck region 17 and a neck region 18, trench 15 is approximately 7 microns wide.

Figure 2:
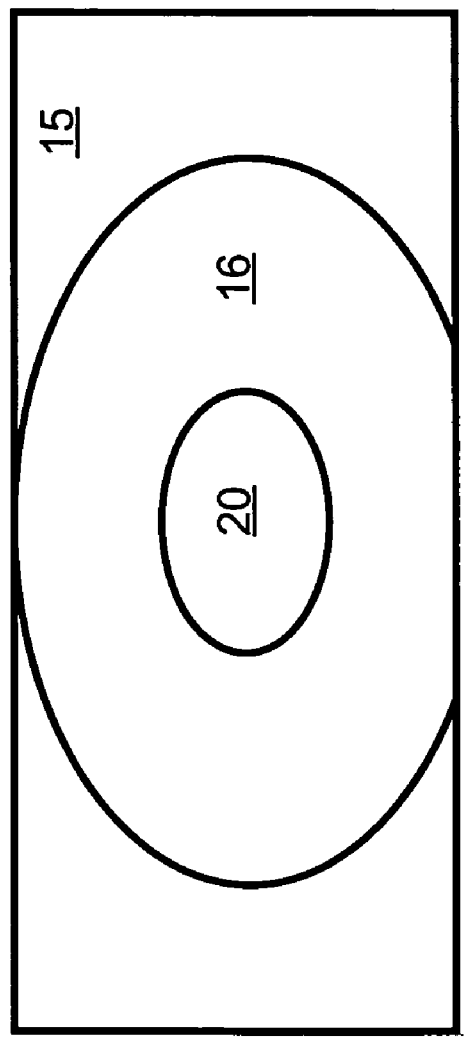
FIG. 2 shows a simplified cross section of the optical switch shown in FIG. 1 in accordance with an embodiment of the present invention.

FIG. 2 shows a simplified cross section of the optical switch shown in FIG. 1. The cross section is made parallel to trench 15. In this cross-sectional view bubble 16 is shown. A region 20 of bubble 16 is an area that must be fluid free along the mirror wall portion of the sidewall of trench 15 at waveguide 11. It is necessary to be fluid free at the mirror wall in order to provide stable reflection for light proceeding down waveguide 11 and reflected into waveguide 12.

Figure 3:
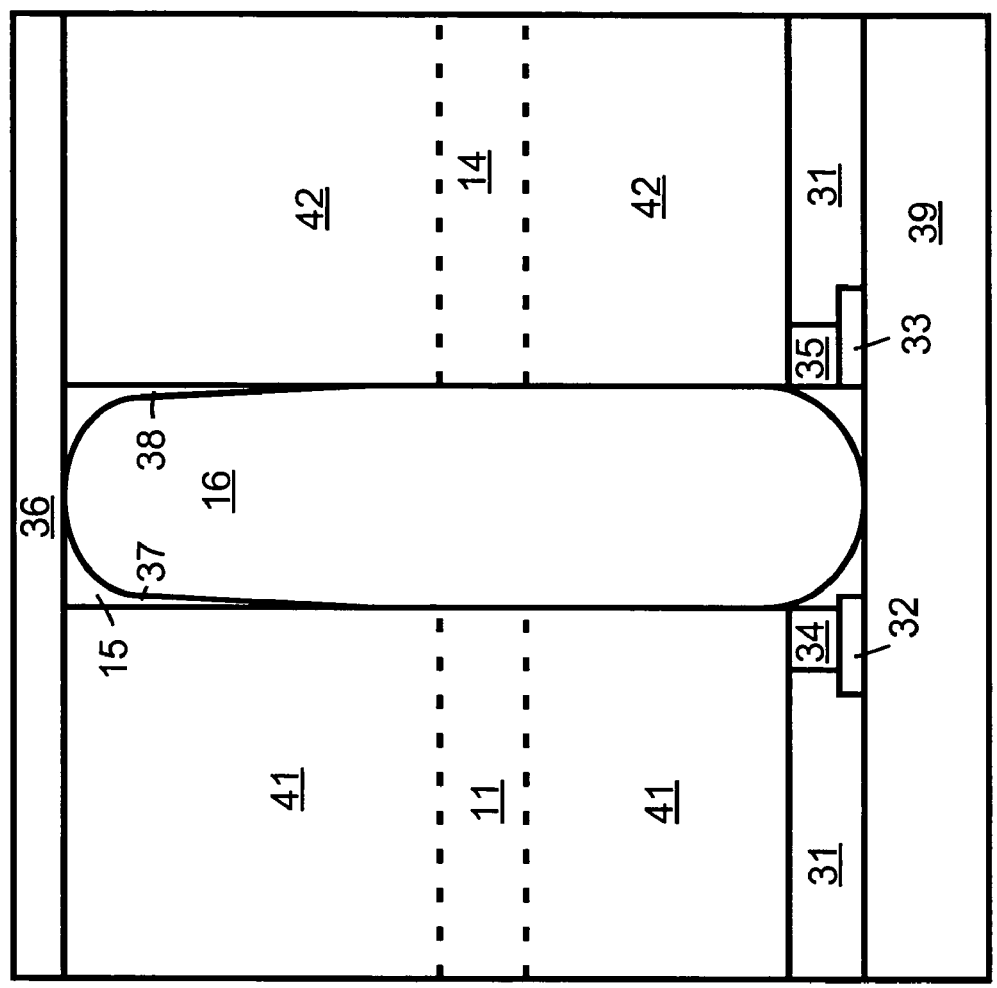
FIG. 3 shows another simplified cross section of the optical switch shown in FIG. 1 in accordance with an embodiment of the present invention.

FIG. 3 shows another simplified cross section of the optical switch shown in FIG. 1. The cross section is made perpendicular to trench 15. In this cross-sectional view bubble 16 is shown. Heat for forming bubble 16 is provided by a heater 32 and a heater 33. Heater 32 and heater 33 are formed on a silicon substrate 39. A pillar region 34 conducts heat from heater 32 to a quartz waveguide structure 41. A pillar region 35 conducts heat from heater 33 to a quartz waveguide structure 42.

A ceiling 36 limits the expansion of bubble 16. A reservoir 31 is the source of index matching fluid. Reservoir 31 is located in the gap between silicon substrate and the quartz waveguide structures 41 and 42. A condensation wedge 37 and a condensation wedge 38 exist against the sidewalls of trench 15 at regions where liquid condenses on the sidewalls. It is desirable to keep condensation wedge 37 from extending down the sidewall to the region where waveguide 11 impinges trench 15. The sidewall at the point where waveguide 11 impinges trench 15 is called the mirror wall because this is where reflection occurs when bubble 16 is in place. If condensation wedge 37 extends down to the mirror wall where waveguide 11 impinges trench 15, this will result in unstable reflection of light from waveguide 11.

In order to prevent condensation on the mirror wall, it is necessary that the mirror wall be hotter than bubble 16. This is accomplished, for example, by producing heat with heater 32 and conducting heat through pillar region 34 to a sidewall of trench 15. In addition to heating the sidewall, condensation is prevented by keeping bubble 16 relatively cool compared to the sidewall.

The temperature of bubble 16 is influenced by the pressure within bubble 16. When bubble 16 is not squeezed at the ends, the temperature of bubble 16 is essentially limited by the temperature needed to support the pressure to push bubble 16 into trench 15 against the surface tension forces that try to expel bubble 16 from trench 15. As the heat is increased, bubble 16 expands in size to accommodate the increased vapor power. This is a constant pressure mode of operation for bubble 16.

If bubble 16 were to expand so that bubble 16 filled trench 15 and thus was squeezed by the sidewalls and the ceiling of trench 15, the pressure within bubble 16 would rise forcing bubble 16 into corners of trench 15, reducing the radius of curvature. The higher bubble temperature resulting from the pressure would tend to increase the condensation on the sidewalls and would make the task of keeping the mirror wall dry very difficult.

Pillar 34 and pillar 35 are optional and are omitted in some embodiments of the present invention. When pillar 34 and pillar 35 are not present, fluid flows through the reservoir 31, across heaters 32 and 33. The walls and the waveguides are heated by conduction through the fluid. The fluid vaporizes when it gets to trench 15. The resulting vapor causes pressure that overcomes the surface tension to inflate bubble 16. The overall temperature of trench 15 must be lower than the bubble temperature or bubble 16 will not collapse when heaters 32 and 33 are turned off. This means there is always condensation taking place. The large trench space moves the condensation areas away from the area of optical interest. A little heat flow up the wall is sufficient to raise the temperature enough to prevent condensation at the mirror wall.

Figure 4:
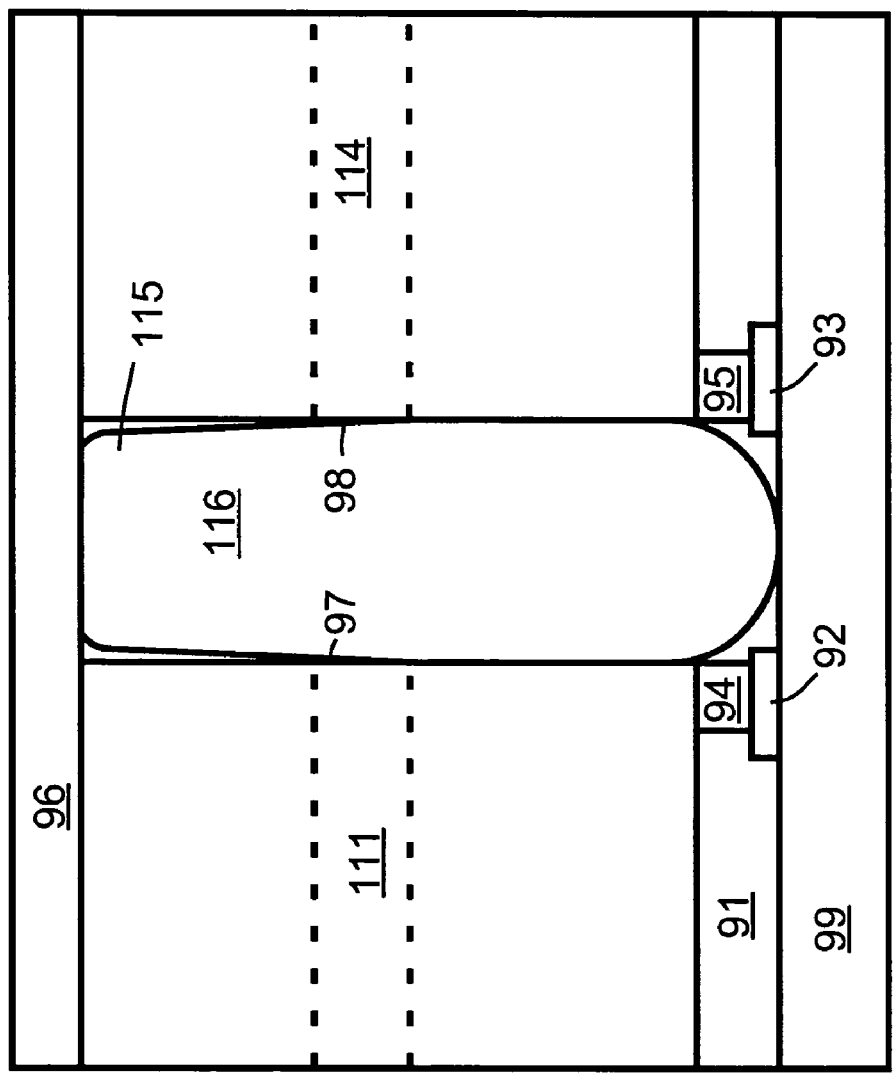
FIG. 4 shows a simplified cross section of another optical switch.

FIG. 4 shows a simplified cross section of another optical switch. In this cross-sectional view a bubble 116 is shown. Heat for forming the bubble is provided by a heater 92 and a heater 93. Heater 92 and heater 93 are formed on a silicon substrate 99. An optional pillar region 94 conducts heat from heater 92 to a sidewall of a trench 115. An optional pillar region 95 conducts heat from heater 93 to another sidewall of trench 115. A ceiling 96 limits the expansion of bubble 116. A reservoir 91 is the source of index matching fluid. A condensation wedge 97 and a condensation wedge 98 exist against the sidewalls of trench 115 at regions where liquid condenses on the sidewalls. Bubble 116 is squeezed by ceiling 96 increasing the pressure and thus the temperature within bubble 116. The increased temperature within bubble 116 allows condensation wedge 97 and condensation wedge 98 to extend down the sidewall to the region where a waveguide 111 impinges trench 115 and where a waveguide 114 impinges trench 115. The sidewall at the point where a waveguide 111 impinges trench 115 is called the mirror wall because this is where reflection occurs when bubble 116 is in place. When condensation wedge 97 extends down to the mirror wall where waveguide 111 impinges trench 115, this results in unstable reflection.

There are various ways to minimize the temperature within a bubble used for an optical switch. For example, the trench can be very deep. This is illustrated, for example, by FIG. 3. As shown in FIG. 3, trench 15 has been made sufficiently deep that bubble 16 extends far way from the mirror wall. With increasing distance from heater 32 and heater 33, the sidewalls of trench 15 become cooler. This results in cooling of bubble 16.

Another way to minimize temperature within a bubble is to lengthen the trench. This is illustrated, for example, in FIG. 2 where trench 15 is shown to be longer than bubble 16. With increasing distance from heater 32 and heater 33, the sidewalls of trench 15 become cooler. This results in cooling of bubble 16.

Another way to minimize temperature within a bubble is to heat only the sidewall that contains the mirror wall. This is illustrated in FIG. 5.

Figure 5:
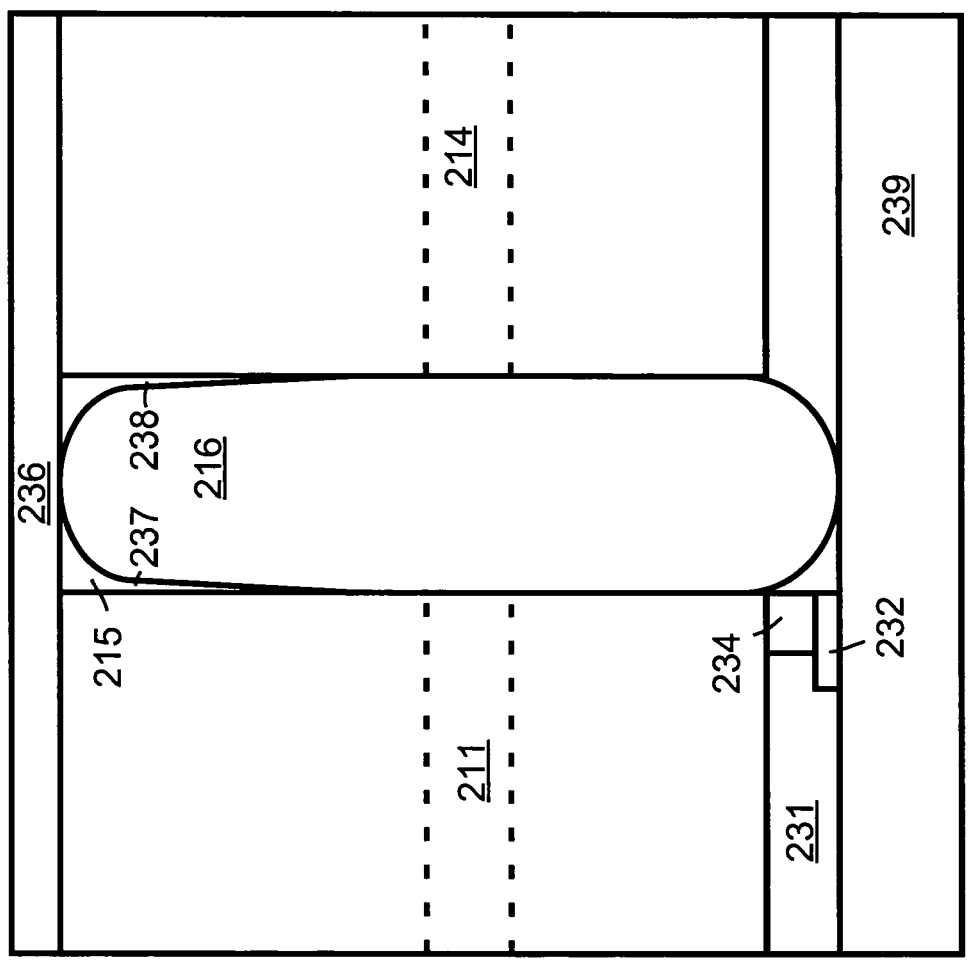
FIG. 5 shows a simplified cross section of an optical switch in accordance with another embodiment of the present invention.

FIG. 5 shows a simplified cross section of another optical switch. In this cross-sectional view a bubble 216 is shown. Heat for forming bubble 216 is provided by a heater 232. Heater 232 is formed on a silicon substrate 239. An optional pillar region 234 conducts heat from heater 232 to a sidewall of a trench 215. A ceiling 236 limits the expansion of bubble 216. A reservoir 231 is the source of index matching fluid. A condensation wedge 237 and a condensation wedge 238 exist against the sidewalls of trench 215 at regions where liquid condenses on the sidewalls. A condensation wedge 238 extends farther down a sidewall of trench 215 than condensation wedge 237 extends down another sidewall of trench 215. Condensation wedge 237 does not extend to the region where a waveguide 211 impinges trench 215. This is helped by heater 232 and pillar 234 keeping the nearest sidewall of trench 215 warm. Condensation wedge 238 may extend to the region where a waveguide 214 impinges trench 215. This is because condensation wedge 238 occurs on a sidewall of trench 215 that is not heated. The one heater/pillar arrangement shown in FIG. 5 tends to keep the overall temperature of bubble 216 lower while heating the sidewall at the crucial location of the mirror wall.

Another way to minimize temperature within a bubble is to widen or thicken the pillars used to conduct heat along the sidewalls. This reduces the temperature of the pillars and thus reduces the amount of heat available to heat the bubbles.

Figure 6:
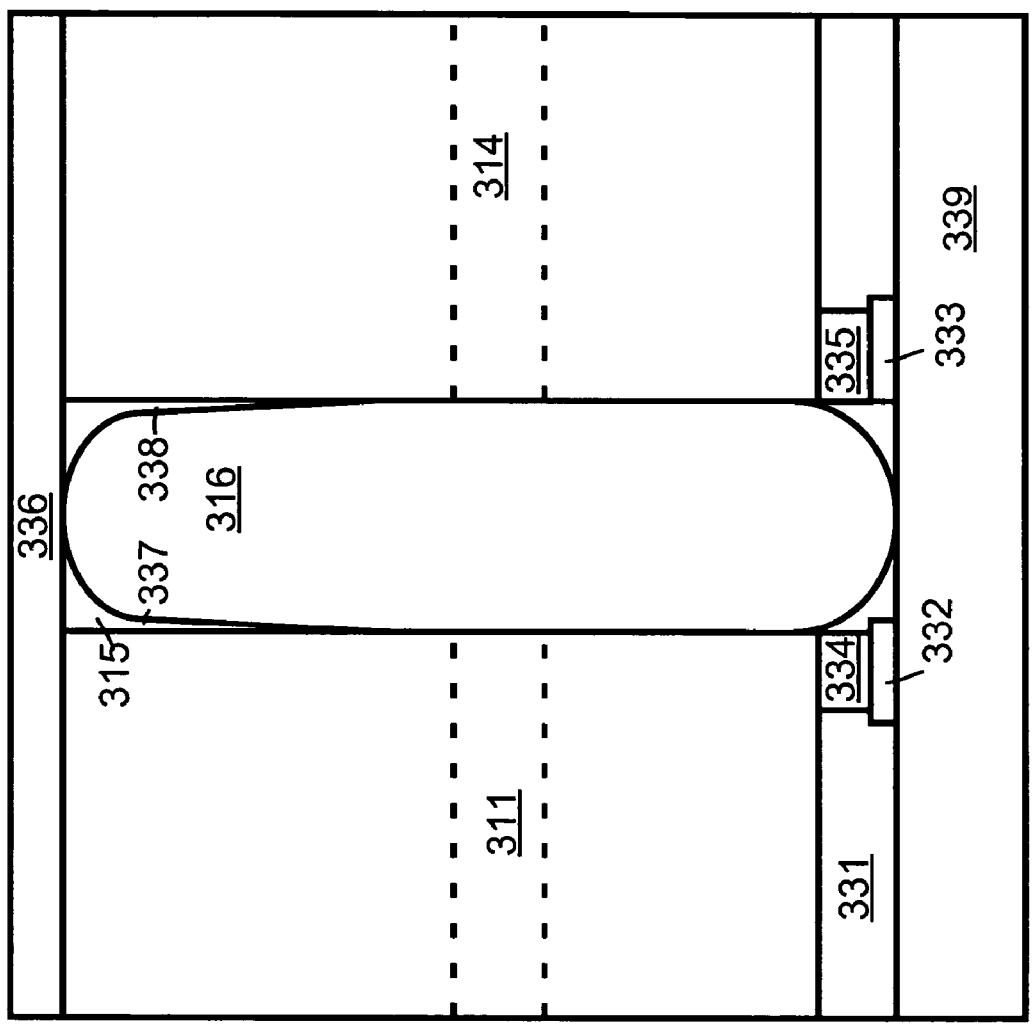
FIG. 6 shows a simplified cross section of an optical switch in accordance with another embodiment of the present invention.

FIG. 6 shows a simplified cross section of another optical switch. In this cross-sectional view a bubble 316 is shown. Heat for forming bubble 316 is provided by a heater 332 and a heater 333. Heater 332 and heater 333 are formed on a silicon substrate 339. A pillar region 334 conducts heat from heater 332 to a sidewall of a trench 315. A pillar region 335 conducts heat from heater 333 to another sidewall of a trench 315. A ceiling 336 limits the expansion of bubble 316. A reservoir 331 is the source of index matching fluid. A condensation wedge 337 and a condensation wedge 338 exist against the sidewalls of trench 315 at regions where liquid condenses on the sidewalls. Condensation wedge 337 does not reach to waveguide 311. Condensation wedge 338 does not reach to waveguide 314. Pillar region 334 and pillar region 335 are shown thicker which tends to make less heat available to heat bubble 316, thus resulting in keeping the overall temperature of bubble 316 lower. Lower heat also results in lower overall size of bubble 316. Thus bubble 316 does not extend over the entire depth of trench 315.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. An optical switch, comprising:
    a first waveguide;
    a second waveguide;
    sidewalls that form a trench, including a first sidewall impinging the first waveguide and a second sidewall impinging the second waveguide, wherein the first waveguide and the second waveguide are positioned so that when the optical switch is in a non-reflection mode, light travels between the first waveguide and the second waveguide; and, a heating system that forms a bubble within the trench, wherein when forming the bubble within the trench, the heating system conducts more heat to the first sidewall than to the second sidewall so that the first sidewall is hotter than the second sidewall.

2. An optical switch as in claim 1 wherein when the optical switch is in the non-reflection mode, light travels from the first waveguide to the second waveguide.

3. An optical switch as in claim 1 wherein the heating system includes:

a heater; and, a pillar that extends from the heater to the first sidewall.

4. An optical switch, comprising:

sidewall means for forming a trench, the sidewall means including a first sidewall and a second sidewall;

first waveguide means for directing light, first waveguide means impinging the first sidewall;

second waveguide means for directing light, the second waveguide means impinging the second sidewall, wherein the first waveguide means and the second waveguide means are positioned so that when the optical switch is in a non-reflection mode, light travels between the first waveguide means and the second waveguide means; and, heating means for heating the trench so that a bubble is formed in the trench, the heating means being arranged to disproportionately heat the first sidewall so that when forming the bubble within the trench, heat from the heating system is disproportionately conducted to the first sidewall so that the first sidewall is hotter than the second sidewall.

5. An optical switch as in claim 4 wherein when the optical switch is in the non-reflection mode, light travels from the first waveguide means to the second waveguide means.

6. An optical switch as in claim 4 wherein the heating means includes:

a heater; and, a pillar that extends from the heater to the first sidewall.

7. A method for operating an optical switch, comprising:

filling a trench with index matching fluid so that light between a first waveguide and a second waveguide passes through a trench; and, forming a bubble within the index matching fluid so that light from the first waveguide is reflected at the trench to a third waveguide; wherein the bubble is formed by heat so that a first sidewall of the trench is heated to be hotter than a second sidewall of the trench, wherein the first sidewall impinges the first waveguide and the second sidewall impinges the second waveguide.

8. A method switch as in claim 7 wherein when the trench is filled with index matching fluid, light travels from the first waveguide through the trench to the second waveguide.

9. A method as in claim 7 wherein forming the bubble includes using a heater to produce the heat; and, using a pillar to spread the heat over the first sedewall.

* * * * *